US 6,739,794 B1

(12) United States Patent
Leonard

(10) Patent No.: US 6,739,794 B1
(45) Date of Patent: May 25, 2004

(54) KEY LOCKING DEVICE

(75) Inventor: Hamlin Leonard, Darien, CT (US)

(73) Assignee: Frank Roth Co., Inc., Stratford, CT (US)

( * ) Notice: Subject to any disclaimer, the term of this patent is extended or adjusted under 35 U.S.C. 154(b) by 142 days.

(21) Appl. No.: 09/655,648

(22) Filed: Sep. 5, 2000

Related U.S. Application Data

(60) Provisional application No. 60/165,954, filed on Nov. 17, 1999, and provisional application No. 60/152,265, filed on Sep. 2, 1999.

(51) Int. Cl.$^7$ .................................................. F16D 1/08
(52) U.S. Cl. ................... 403/343; 403/374.4; 403/370; 403/369; 403/356
(58) Field of Search .................... 403/2, 409.1, 374.4, 403/370, 341, 369, 356, 355, 343

(56) References Cited

U.S. PATENT DOCUMENTS

| | | | | | |
|---|---|---|---|---|---|
| 1,138,368 A | * | 5/1915 | Feeley | ........................ | 403/355 |
| 1,612,769 A | * | 12/1927 | O'Connell | ................... | 403/356 |
| 2,691,541 A | * | 10/1954 | Benedek | ..................... | 403/370 |
| 2,994,548 A | * | 8/1961 | McGogy | ...................... | 403/356 |
| 3,841,774 A | * | 10/1974 | Maxey | ........................ | 403/358 |
| 3,849,014 A | * | 11/1974 | Maxey | ........................ | 403/370 |
| 4,576,504 A | * | 3/1986 | Hartman | ...................... | 403/355 |
| 5,536,105 A | * | 7/1996 | Ise | .............................. | 403/367 |
| H1647 H | * | 5/1997 | Appleman | ................... | 403/355 |

FOREIGN PATENT DOCUMENTS

| | | | | |
|---|---|---|---|---|
| DE | 3418993 A1 | * | 11/1985 | ............. F16D/1/08 |
| DE | 3536920 C1 | * | 9/1986 | ............. F16D/1/08 |

* cited by examiner

Primary Examiner—Lynne H. Browne
Assistant Examiner—Ernesto Garcia

(57) ABSTRACT

The coupling device is an assembly comprising of three congruently shaped axially extending parts with mating wedge-like angular cuts intended to cause said parts to expand in a direction of the minor width when a screw type fastener pulls the two outer members together. those angular surfaces are made so the parts do not permanently lock up, thereby allowing the device to be removed and re-used. The angles should be equal so the parts stay put axially when the screw is tightened. The cross-section of each of the three members is in the form of identical cat-eyes, (e.g. two intersecting circles whose centers do not coincide, and whose minor width is less than the radii. The circles comprising the cat-eye are preferably equal. This is the preferred embodiment.

2 Claims, 8 Drawing Sheets

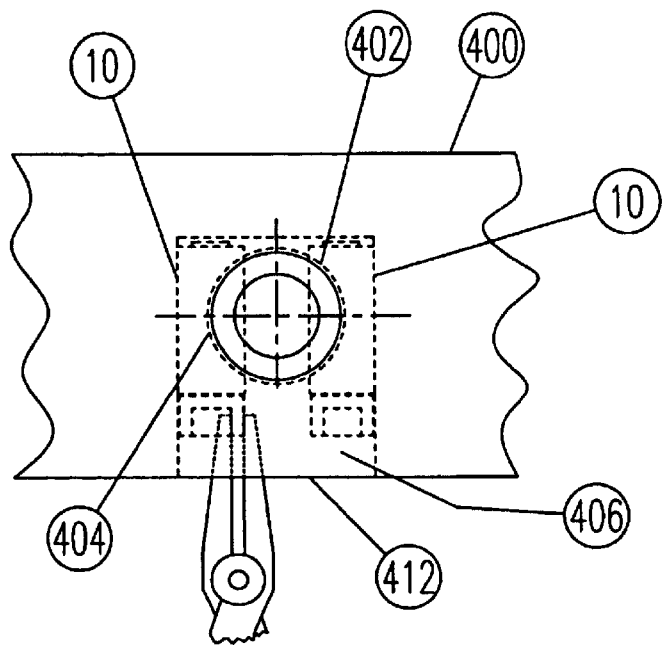
FIG. 11A
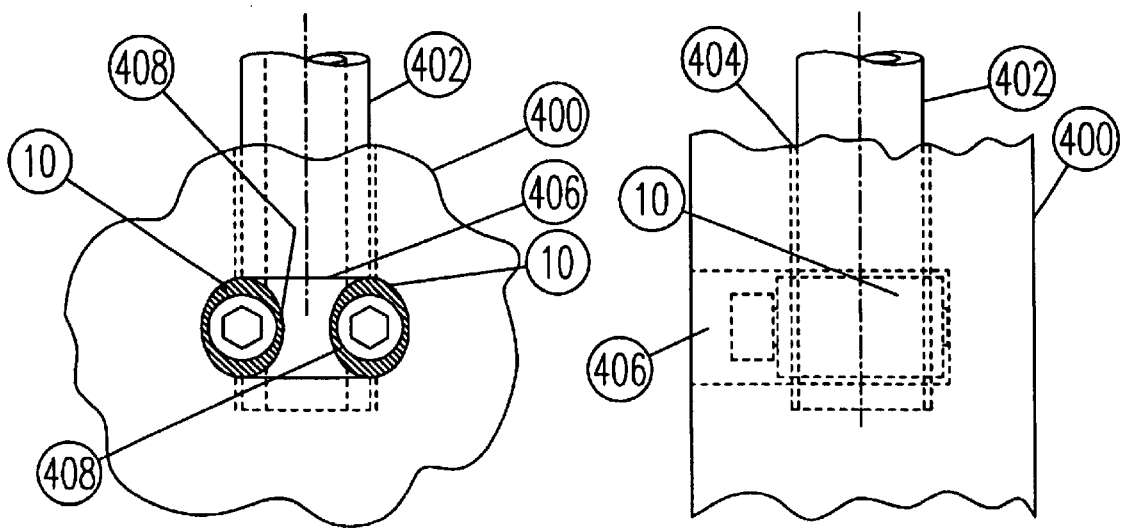
FIG. 11B
FIG. 11C

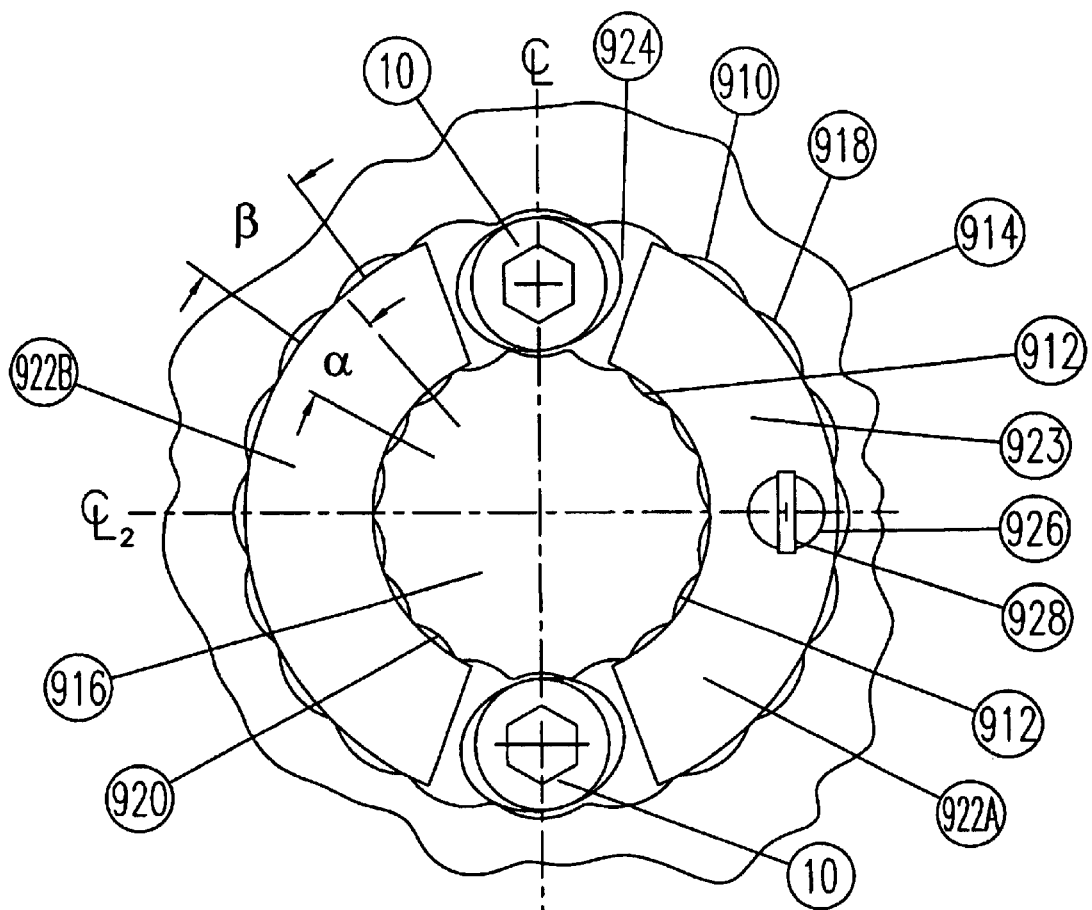
FIG. 14
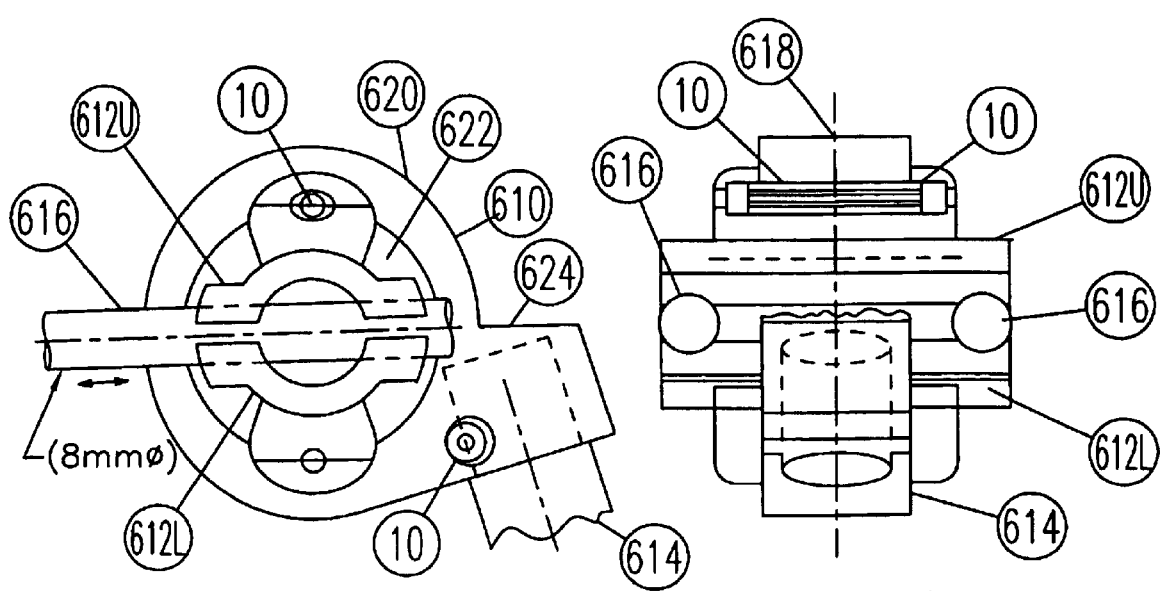
FIG. 13A
FIG. 13B

KEY LOCKING DEVICE

CROSS-REFERENCE TO RELATED APPLICATION(S)

This application claims the benefit of U.S. Provisional Application No. 60/152,265 filed Sep. 2, 1999, and U.S. Provisional Application No. 60/165,954, filed Nov. 17, 1999, which are incorporated by reference herein in their entirety.

BACKGROUND OF THE INVENTION

1. Field of the Invention

The present invention relates to key locking devices and, more particularly, to expandable key locking devices for locking and coupling a first part to a mating second part.

2. Prior Art

The problem of connecting mating male and female parts, such as for example connecting shafts to mating gears or pulleys, in order to transfer torques and/or axial forces between the mated male and female parts has been one of the immutable engineering problems. Accordingly, many efforts have been expended to find a satisfactory solution to this problem. Some of the solutions tried in the prior art include providing either or both the male and female parts with bolting flanges which are mechanically fastened to surfaces of the mating part seated on the flange. Bolting flanges, however, significantly increase the size and weight of the connection between parts, and thus, are not satisfactory for applications where size, weight, and cost are critical. Another well know attempt at solving the problem of connecting the male and female parts uses keys, such as square keys or Woodruff keys, housed in keyways machined or otherwise formed in both the male and female parts. The keys act in shear to transfer torque and axial loads between mated male and female parts. Use of keyed connections generally does away with the bulk and weight of flanged connections, but in turn requires machining of close tolerance keyways into both the male and female parts which is both costly and time consuming. They are frequently insufficiently accurate and subject to failure, as it is virtually impossible to get zero play. Reversing loads beat up traditional keys and destroy them. Furthermore, the keyways formed into both the male and female parts reduce the effective cross-sectional area of the parts, and have square corners that raise stresses thereby having a weakening effect on the parts. In addition, some keys may have to be fastened to one of the parts with set screws to prevent the keys from exiting the keyways during use. This requires a hub, creating additional size and weight to accommodate the set screw. Fabrication of the set screw holes and installation of the set screw further increases the cost and complexity of the keyed connections. Still another solution of the prior art attempts to eliminate the problems with flanged connections and keyed connections by using keyless bushings or expandable keys to connect the mating male and female parts. The keyless bushings of the prior art generally have inner and outer tapered sections which when clamped together generate radial pressure that locks the mated parts together. One example is U.S. Pat. No. 3,849,014 which discloses an expandable hub locking assembly with inner and outer annular hub parts which have slidably engaging frustoconical surfaces interconnected by three screws. Rotation of the screws causes sliding engagement of the frustoconical surfaces which produces radial contraction and expansion of the inner and outer hub parts onto the shaft and bore. Another example is U.S. Pat. No. 3,841,774 which discloses an expandable shaft key having first and second key parts which slidably engage each other along sloping surfaces and are connected by a threaded rod. The keyless bushing or expanding keys of the prior art are generally large in size in order to provide large contact surfaces for gripping the male and female parts. The keyless bushing is standard in the industry where designers require extremely large clamping forces. Because of their limited ability to grab onto the shaft, and their increased ability to force the hub, the forces have a propensity to split the hub. The keyless bushings also slip or translate axially when tightening the screw. The present invention overcomes the limitations and problems of the prior by providing a small, inexpensive key which may be used without keyways to effectively lock male and female parts together to simultaneously transfer both torques and axial loads therebetween. If keyways are used, modern end-milling methods are far faster, far more economical and far more accurate than those used by traditional keys. The device of the present invention does not suffer from installation play, allows larger tolerances when machining keyways, and has significantly more surface contact. The device of the present invention is vibration proof and easily removed. Also they may be ganged axially or circumferentially. Furthermore, the keyway of the present invention may be readily cut with a standard drill and drill press along with an inexpensive drill jig that has been designed for this purpose.

SUMMARY OF THE INVENTION

In accordance with a first embodiment of the present invention, a coupling device for coupling a first part to a second mating part is provided. The coupling device comprises a fastener, a distal member, and an intermediate member. The fastener has a support shoulder extending radially from the fastener. The distal member is movably engaged to the fastener to move relative to the fastener along a longitudinal axis of the fastener when the fastener is turned relative to the distal member. The intermediate member is disposed on the fastener between the distal member and support shoulder of the fastener. When the distal member is moved towards the support shoulder on the fastener, the distal member is biased against the intermediate member for effecting outward expansion of the coupling device relative to the longitudinal axis of the fastener. Thus, the coupling device is an assembly comprising of three congruently shaped axially extending parts with mating wedge-like angular cuts intended to cause said parts to expand in a direction of the minor width when a screw type fastener pulls the two outer members together. Those angular surfaces are made so the parts do not permanently lock up, thereby allowing the device to be removed and re-used. The angles may be equal so the parts stay in place axially when the screw is tightened.

In accordance with a second embodiment of the present invention, a mechanical connection between a first part and a second mating part is provided. The first part has an inner opening into which a mating portion of the second mating part is located. The mechanical connection between the first and second parts is provided by an expandable coupling positioned between an inner surface of the inner opening of the first part and the mating portion of the second part. The expandable coupling comprises a fastener with a support shoulder thereon. The expandable coupling also has an end member threadably mounted on the fastener, and an intermediate member mounted on the fastener between the support shoulder and the end member. When the fastener is threaded into the end member, the end member is biased against the intermediate member causing an outer surface of the intermediate member to be displaced outward relative to the fastener and effecting expansion of the expandable coupling.

In accordance with a third embodiment of the present invention, a key assembly for connecting a first part to a mating second part is provided. The key assembly comprises a fastener, a first wedge section connected to the fastener, a second wedge section connected the fastener, and a third wedge section connected to the fastener. The third wedge section is disposed between the first and second wedge sections. When the first and second wedge sections are drawn together with the fastener, the third wedge section is cammed outwards relative to the longitudinal axis of the fastener. The fastener holds the first wedge and the second wedge together so that the key assembly is expanded.

BRIEF DESCRIPTION OF THE DRAWINGS

The foregoing aspects and other features of the present invention are explained in the following description, taken in connection with the accompanying drawings, wherein:

FIGS. 11A–11C are respectively a top plan view, a first partial side elevation view, and a second partial side elevation view of a mechanical coupling using the key in FIG. 1A in accordance with an eighth preferred embodiment of the present invention;

FIGS. 13A–13B are respectively a side elevation view and an end elevation view of a saddle clamp bracket attachment using the key assembly shown in FIG. 1A; and FIG. 14 is a partial end elevation view of a connection between mating male and female parts using the key shown in FIG. 1A, wherein the male and female parts may be indexed approximately 360° relative to each other;

DETAILED DESCRIPTION OF THE PREFERRED EMBODIMENTS

Figure 1A:
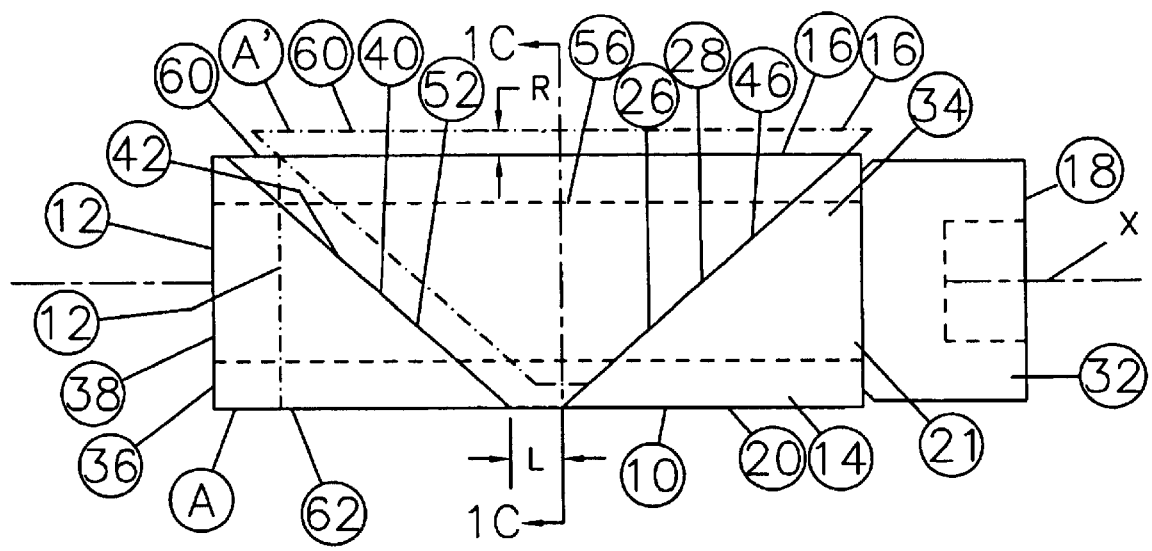
FIGS. 1A–1B are respectively a side elevation view and an end elevation view of an expandable key assembly incorporating features of a first preferred embodiment of the present invention.
Figure 1B:
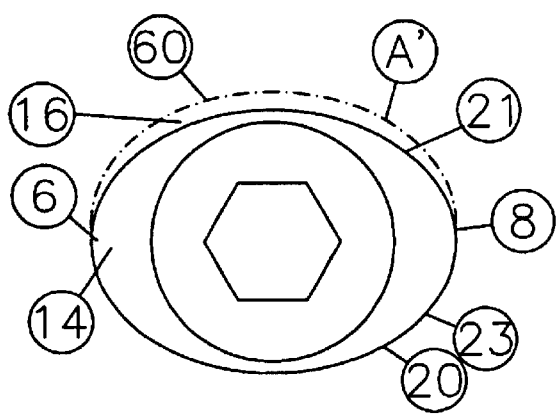

Referring to FIGS. 1A–1B, there are shown respectively a side elevation view, and an end elevation view of a key assembly 10 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used.

Still referring to FIGS. 1A–1B, the expandable key 10 is an assembly which generally comprises a front end piece 12, an intermediate or mid-piece 16, and a rear end piece 14 which are sequentially interconnected by a clamping fastener 18. The front, mid, and rear end pieces 12, 16, 14 have camming surfaces which slidably engage each other to expand the key 10 when the front and rear end pieces 12, 14 are drawn together with the fastener 18. The key 10 is generally adapted to be inserted and expanded between opposing surfaces of mating parts, such as for example, a gear or pulley mounted on a shaft (not shown) to lock the surfaces together effecting torque and load transfer between the parts.

In particular, the key 10 may be made in whole or in part from metal, such as steel or aluminum, or from plastic, or from any other suitable type of material. As can be seen from FIG. 1A, the fastener 18 is a threaded fastener which generally has a head 32 and partially threaded shank 34 depending therefrom. For example, the fastener 18 of the key 10 may be a bolt, such as a hex head bolt, cap screw, machine screw, thumb screw, or any other suitable type of threaded fastener. As seen best in FIG. 1B, the rear end piece 14 has an exterior surface 20 with a generally cat-eye or oval shape, though in alternate embodiments the exterior may have any other suitable shape. The exterior 20 of the rear end piece 14 is preferably defined by upper and lower curvilinear surfaces 21, 23 blended together at the sides of the rear piece. As shown in FIG. 1B, the upper and lower curvilinear surfaces 21, 23 may be symmetrical, although, in alternate embodiments the outer surface of the rear end piece of the key assembly may be formed by asymmetrical upper and lower lobes as will be described in greater detail below. The upper and lower surfaces 21, 23 may be generally radiused or rounded surfaces. In alternate embodiments, the upper and lower surfaces may be generally elliptical or may have any other suitable shape. In the preferred embodiment, rounded portions 6, 8 connect the upper and lower surfaces 21, 23 at the sides of the rear section 14 (see FIG. 1B). In alternate embodiments, the upper and lower curvilinear surfaces may be joined at the sides by substantially straight sections. The exterior of the rear end piece 14 may be knurled, scarified, serrated or may have a tungsten carbide ball projecting therefrom (see also FIG. 3) to enhance the gripping characteristics of the key when engaged to the mating parts. The rear end piece 14 has a center bore 21 adapted to admit the shank 34 of the bolt 18 therethrough. The diameter of the center bore is sized to provide nominal radial clearance between the rear end piece 14 and the shank 34 of the bolt 18. The front face 26 of the rear end piece 14 has cam or wedge surface 28 for engaging the mid-section 16 of the key 10.

The cam surface 28 is pitched relative to the longitudinal axis X of the key 10 at an angle of about 43°. In alternate embodiments, the front face of the rear end piece may have any other suitable configuration defining one or more cam surfaces pitched at any suitable angle to provide a suitable mechanical advantage.

Still referring to FIGS. 1A–1B, the front end piece 12 of the key 10 has an exterior surface 62 which has a generally elliptical or oval shape similar to the exterior 20 of the rear end piece 14 of the key 10. Accordingly, the exterior surface 62 of the front end piece 12 also comprises upper and lower generally rounded surfaces similar to the upper and lower curvilinear surfaces 21, 23 of the rear end piece 14. The front end piece 12 has a center bore 38. The center bore 38 is threaded to complement the threaded profile of the threaded shank 34 of the bolt 18. The front face 36 of the front end piece 12 is substantially flat though it may have any other suitable shape. As seen in FIG. 1A, the rear face 40 of the front end piece 12 is substantially symmetrical to the front face 26 of the rear end piece 14. Accordingly, the rear face 40 of the front end 12 has a cam or wedge surface 42.

Figure 1C:
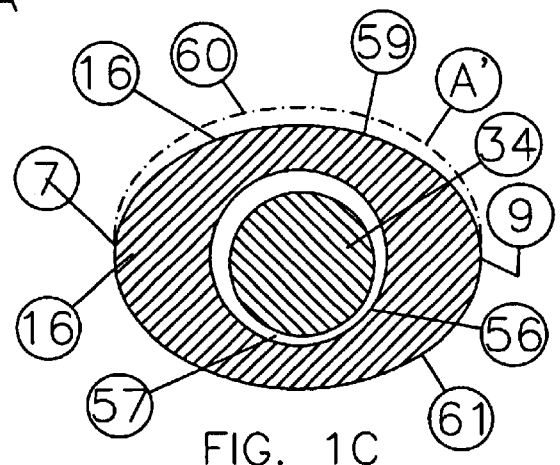
FIG. 1C is a cross-sectional view of the key assembly taken through line 1C in FIG. 1A.

Referring now also to FIG. 1C, the mid-piece 12, preferably, has an exterior surface 60 which is also generally oval or with a cat-eye shape, substantially similar in shape to the exterior surface 20 of the rear end piece 14 (see FIG. 1B). In alternate embodiments, the mid-piece of the key may have any other suitable shape to engage mating features of a contact surface a against which the mid-piece of the key is abutted. As shown in FIG. 1C, the exterior surface 60 of the midpiece 16 is preferably also defined by substantially symmetrical, generally rounded upper and lower surfaces 59, 61. The upper and lower surfaces 59, 61 may have a generally radiused shape. Alternatively, the upper and lower surfaces of the midpiece may have a generally elliptical shape or may have any other suitable oval or ovoid shape. In still other alternate embodiments, the shape of the upper and lower surfaces of the midpiece may have different shapes so that the exterior surface of the mid-piece is asymmetrical top and bottom. Similar to the rear end piece 14 and front end piece 12, the exterior surface 60 of the midpiece 16 has opposing rounded portions 7, 9 connecting the upper and lower surfaces 59, 61 along the sides of the midpiece 16 (see FIG. 1C). The exterior surface of the mid-piece 16 may have serrations 54B,(see also FIG. 3) or a tungsten carbide ball projecting therefrom to enhance the griping characteristics of the mid-piece. The mid-piece 16 has a center bolt hole 56. The center bolt hole 56 may be generally oversized relative to the shank 34 of the bolt 18 to allow radial movement between the mid-piece 16 and the shank 34 as indicated by arrows R in FIG. 1A. The center bolt hole 56 may also be located off-center so that the bolt 18 and mid-piece are somewhat misaligned when the key 10 is assembled. The misalignment between bolt hole 56 and bolt 18 may be located in a direction in which the mid-piece is to be extended. This provides an increased gap 57 between the fastener shank 34 and hole 56, thereby allowing a larger range of movement of the mid-piece 16 in direction R when the key is expanded. The front face 46 and rear face 52 of the mid-piece 16 are sloped to generally conform to the opposite mating faces 26 and 40 of the front and rear end pieces 12, 14 of the key 10.

The front end, mid, and rear end pieces 14, 16, 12 of the key assembly 10 may be manufactured from a common block of stock. The block may be machined to form the generally cat-eye exterior shape shown in FIG. 1B congruent with the exterior of the front end, mid, and rear end pieces. The block may then be cut diagonally to form the wedge surfaces of the front end, mid, and rear end pieces 14, 16, 12.

Referring still to FIGS. 1A–1B, the key 10 is assembled by placing the rear end piece 14, the mid-piece 16, and the front piece 12 consecutively on the bolt 18. The flat face 24 of the rear end piece 14 is seated against the bolt head 32. The bolt 18 is threaded into the front piece 12 until the exterior surface 60 of the mid-piece 16 is generally flush with the exterior surfaces 20, 62 of the rear end and front end pieces 14, 12 (see FIG. 1A). The bolt 18 is not torqued further at this time, and the key 10 has configuration A shown in FIG. 1A. As can be realized from FIGS. 1A–1B, the exterior surfaces 20, 60, 62 of the rear, mid, and front end pieces 2, 16, 14 are generally congruent with each other when the key 10 is in configuration A. The front, mid and rear end pieces are proportioned such that the opposing surfaces in the direction of expansion run substantially the full length of the assembly. In this configuration, gap 57 is formed between the oversized and possibly misaligned center bolt hole 56 in the mid-piece 16 and the bolt shank 34 (see FIG. 1C). The gap 57 between the bolt hole 56 and bolt shank 34 allows the mid-piece to move freely in the direction shown by arrow R. As the bolt is threaded into the front piece 12, the front and rear pieces 12, 14 of the key are drawn together in direction indicated by arrows L in FIG. 1A. The cam surfaces 28, 42 of the front end and rear end pieces 12, 14 respectively cam against the front and rear faces 46, 52 of the mid-piece 16 thereby displacing the mid-piece in direction R so that the key 10 is in the expanded configuration A' shown in FIGS. 1A, 1B. Table 1 below lists some examples of preferred dimensions for various sizes of the key assembly 10 shown in FIGS. 1A–1B

| BIKE | MILS TRICK | MILS WIDE | OVERALL LENGTH | MAX. EXPANSION R | LINEAR MOTIONS L | MAJOR RADIUS | SCREW SIZE & LENGTH | SCREW SEATING TORQUE IN-LBS | MODE | *AXIAL FORCE LBS | SHAFT SIZE INCH | *TORQUE IN-LBS | *SHEAR FORCE LBS |
|---|---|---|---|---|---|---|---|---|---|---|---|---|---|
| 1 | 100 | 144 | 0.271 | 0.008 | 0.017 | 3/64 | 0-80 × 5/16 | 2.25 | FRICTION SHEAR | 44 — | 1 — | 32 125 | — 250 |

-continued

| BIKE | MILS TRICK | MILS WIDE | OVER- ALL LENGTH | MAX. EXPAN- SION R | LINEAR MO- TIONS L | MAJOR RAD- IUS | SCREW SIZE & LENGTH | SCREW SEATING TORQUE IN-LBS | MODE | *AX- IAL FORCE LBS | SHAFT SIZE INCH | *TORQUE IN-LBS | *SHEAR FORCE LBS |
|---|---|---|---|---|---|---|---|---|---|---|---|---|---|
| 2 | 200 | 288 | 0.348 | 0.016 | 0.034 | 3/32 | 4-40 × 5/8 | 14 | FRIC- TION SHEAR | 148 — | 1 | 74 545 | — 1,090 |
| 3 | 400 | 577 | 1.050 | 0.032 | 0.069 | 5/16 | 1/4- 20 × 11/8 | 178 | FRIC- TION SHEAR | 780 — | 1 | 390 1,930 | — 3,860 |
| 4 | 800 | 1,154 | 3,100 | 0.044 | 0.137 | 5/9 | 1/2- 13 × 11/4 | 1.840 | FRIC- TION SHEAR | 3,475 — | | 3,475 15,450 | — 15,450 |

The dimensions provided in Table 1 are for example purposes, and the key assembly may have any other suitable dimensions. Screw seating torque values in Table 1 are also merely exemplary and other suitable seating torques may be used. The axial force, torque, and shear force columns, which are marked with an asterick * are calculated values based on the dimensions in Table 1. As evident from the Table 1, the smallest assembly may utilize the tiniest (0.080) commercially available alloy cap screw, and may be about the size of a grain of rice. The materials of the three members can vary in accordance with the application, (i.e. the environment, the strength required, friction values of adjoining parts, and the like). The proximal and distal members may be made of materials different from the intermediate member. When in the preferred torque mode, the shear strength developed is extremely high, and directly proportional to the yield strength of the fastener. In the preferred embodiment, the fastener is made of heat treated high strength alloy steel.

Figure 2A:
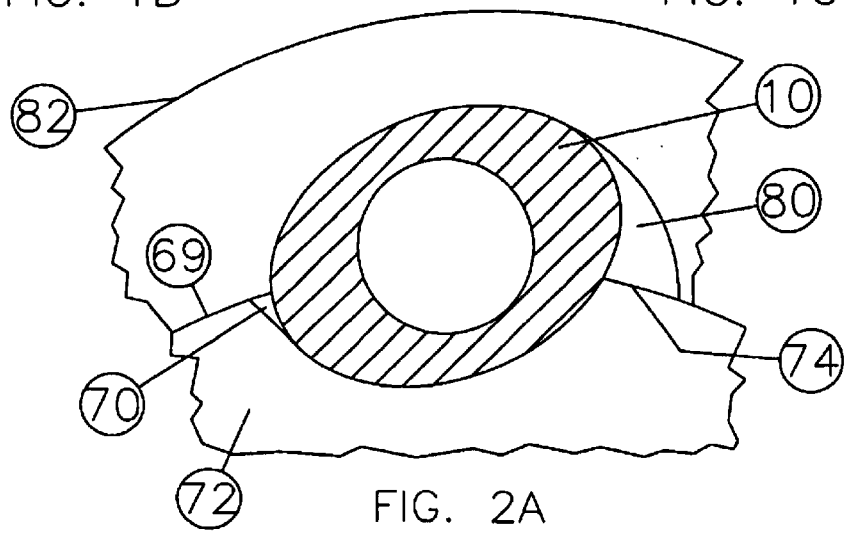
FIGS. 2A–2B are respectively an end elevation view, and a cross-section view of the expandable key assembly in FIG. 1A shown in an installed position connecting inner and outer mating parts.
Figure 2B:
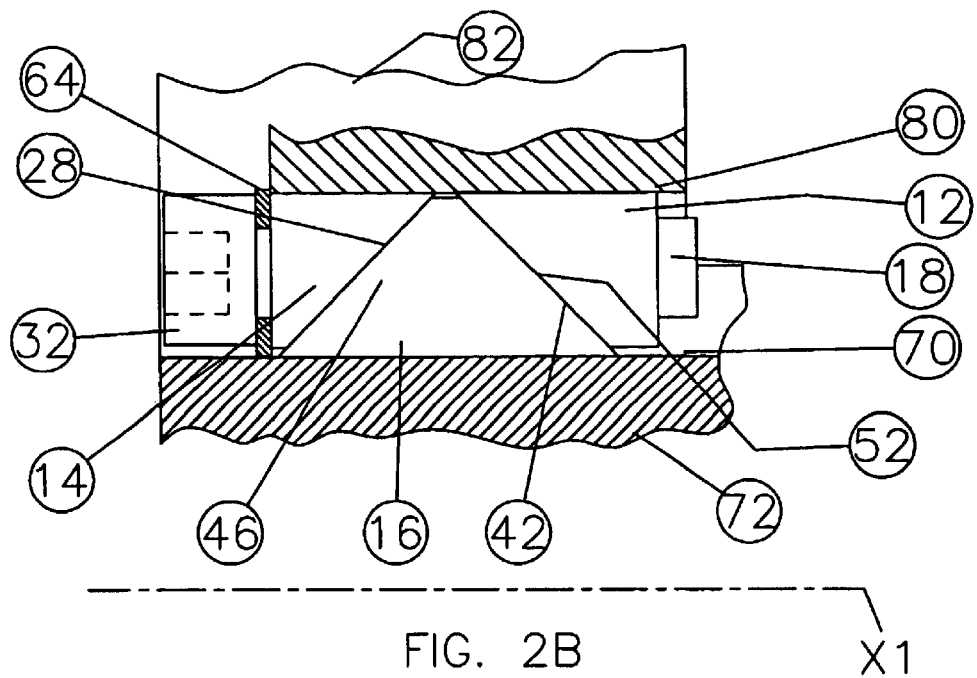

FIGS. 2A–2B show the key assembly installed in a longitudinally mounted configuration between mating parts 82, 72. By way of example, outer mating part 82, may be a gear or pulley which is mated to a shaft 72. However, the key assembly may be used in a manner similar to that shown in FIGS. 2A–2B to connect any outer part mounted on any mating inner part. In this configuration, key assembly 10 is mounted generally aligned with an axis of symmetry X1 (see FIG. 2B) of the mating parts 82, 72. The key assembly 10 located in keyways 80, 70 of mating parts 82, 72. Keyway 80 is formed in the inner mating surface of the outer part 82. Keyway 70 is formed in the outer mating surface 74 of the inner part 72. Each keyway 80, 70 has a generally oval or curved cross section generally conforming to the outer surface 20, 60 of the key 10. In alternate embodiments, the keyways may have any other suitable shape such as a rectangular cross section. When the inner and outer parts 72, 82 are mated, the keyways, 70, 80 are generally aligned longitudinally. The keyways 80, 70 of the mating inner and outer parts may also be aligned circumferentially. Generally, some angular mis-alignment will exist between the keyways 80, 70 of the mating parts. FIG. 2A shows the keyways 80, 70 angularly mis-aligned. The key assembly 10, due to its oval shape is capable of accommodating the angular mis-alignment, and can be installed in the keyways 80, 70 even though there is mis-alignment therebetween. To install the key 10 in the keyways 80, 70, the key is orientated so that the larger axis of the oval key is tilted thereby allowing the key to fit between the mis-aligned keyways as shown in FIG. 2A. The key assembly 10 may be provided with a stop washer 64 placed between the fastener head 32 and rear end piece 12. As shown in FIG. 2B, stop washer 64 engages the side of a mating part 82, 72 to stop insertion of the key assembly 10 into the keyways 80, 70. The stop washer 64 may be shaped to conform to the shape of the keyway 70 to prevent rotation of the washer about the fastener 18. The key 10 is then engaged by torqueing the bolt 18 to displace midsection 16 to position A' (see FIG. 1A) and expand the key in the keyways thereby providing a connection between the mating parts. FIG. 2B shows that key 10 in its expanded position between inner and outer parts 72, 82.

To aid initial assembly of the key assembly 10, the front end, rear end and mid-pieces may be properly orientated relative to each other for easiest insertion and cemented together with very short duration setting glues. In this manner a unitized assembly may be provided at installation of the key 10. When the fastener is turned to engage the key 10, the glue seal is readily broken.

Figure 3:
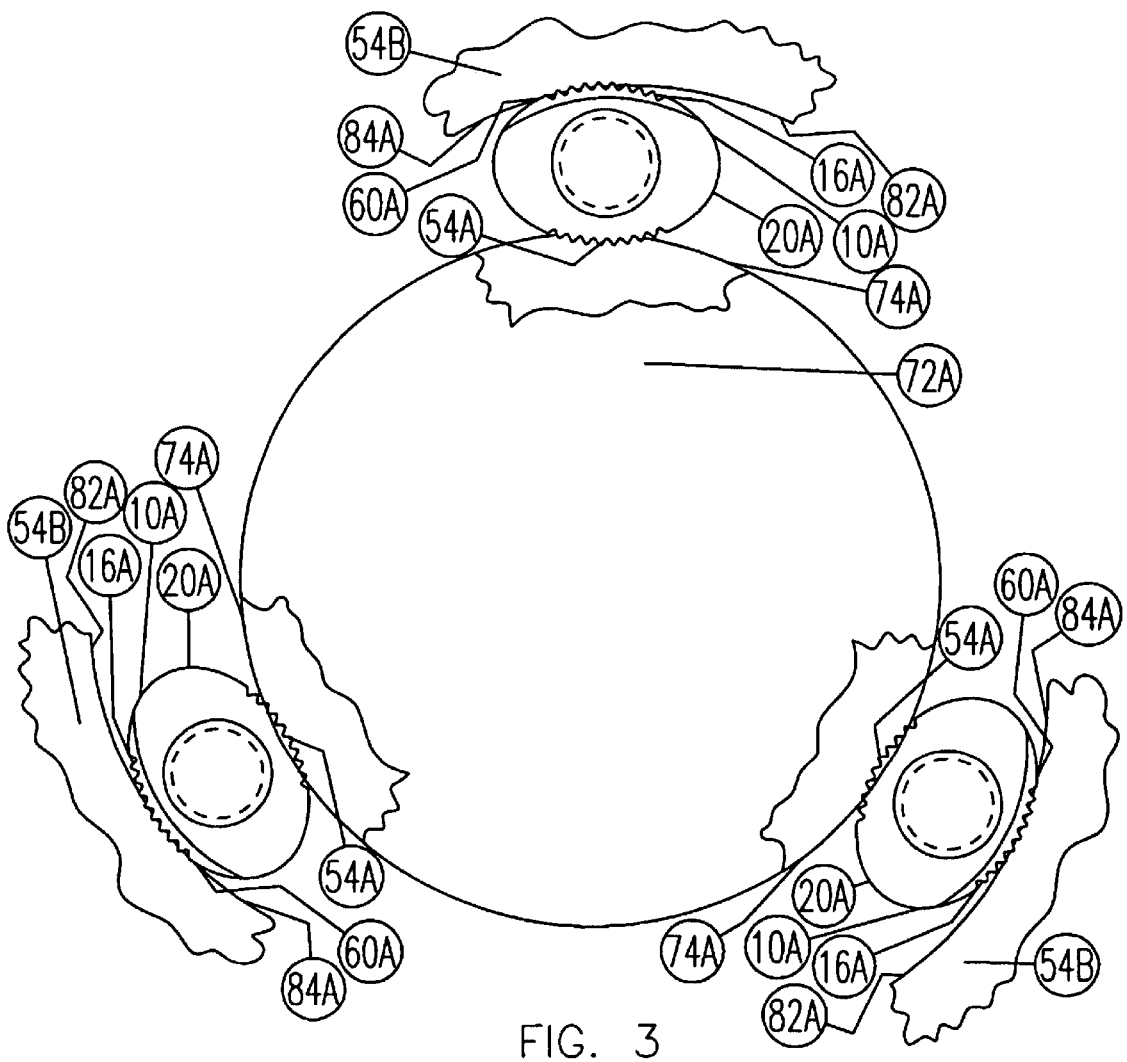
FIG. 3 is an end elevation view of an expandable key assembly in accordance with a second preferred embodiment of the present invention.

FIG. 3 shows an end view of a coupling between an inner shaft or part 72A and outer part 82A using a number of expandable key assemblies 10A in accordance with a second preferred embodiment of the present invention. Each key assembly 10A is substantially similar to key assembly 10 shown in FIGS. 1A–1B and described above. As shown in FIG. 3, each key assembly 10A is installed between the inner and outer surfaces 84A, 74A of mating parts 80A, 72A without placing the key 10 in a keyway. The outer elliptical surface 20A of the key 10A may have serrations, or projections 54A on the bottom for gripping the outer surface 74A of the inner part 72A when the key 10A is expanded. The outer surface 60A of the mid piece 16A has serrations, or projections 54B on top to engage and grip the inner surface 84A of the outer part 82A when the key 10A is expanded. In alternate embodiments, the outer surface of the midsection may have a tungsten carbide ball embedded therein, in lieu of the outer serrations, so that a portion of the ball projects outwards. In order to secure the inner and outer parts 72A, 82A, three keys 10A are preferably placed equally around the outer surface 74A of the inner part 72A. The clamping force between each key 10A and the mating parts 72A, 82A is thus disposed at equally distributed points around the two parts to hold the inner part securely in the outer part. In alternate embodiments, any number of expandable keys may be placed between inner and outer parts to transfer axial force and torque between parts.

Figure 8:
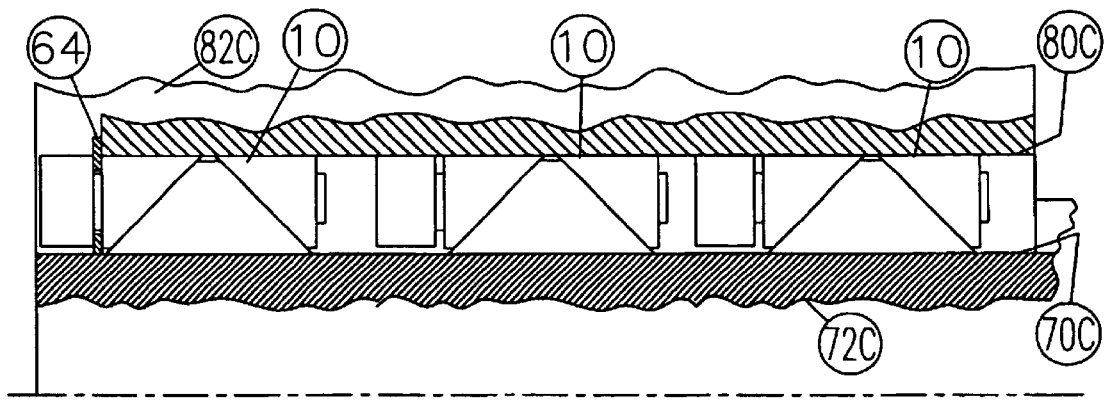
FIG. 8 is another partial cross-sectional view of a coupling between an inner part and an outer part using the key assembly in FIG. 1A in a ganged configuration.

Referring now to FIG. 8, there is shown another partial cross-sectional view of a coupling between an inner part or shaft 72 within an axis of symmetry Xc and an outer part 82C. In this embodiment, a number of expandable key assemblies 10 are ganged to couple the inner part to the outer part. The key assemblies 10 are placed in axial keyways 70C, 80C of the inner and outer parts 72C, 82C similar to the configuration shown in FIGS. 2A–2B. As seen in FIG. 8, the key assemblies 10 are ganged in tandem. FIG. 8 shows three key assemblies 10 ganged in tandem, for example purposes only. In accordance with this invention, any desired number of key assemblies 10 may be ganged in order to transfer axial forces and torques between the inner and outer parts 72C, 82C. The assemblies 10 are sufficiently short to allow any multiple key assemblies of minimal width to be aligned in a series of abutting elements and be individually secured and unsecured by tightening each one successively and one at a time using the same keyway 70C, 80C and accessing all from one end.

Figures 4A, 4B:
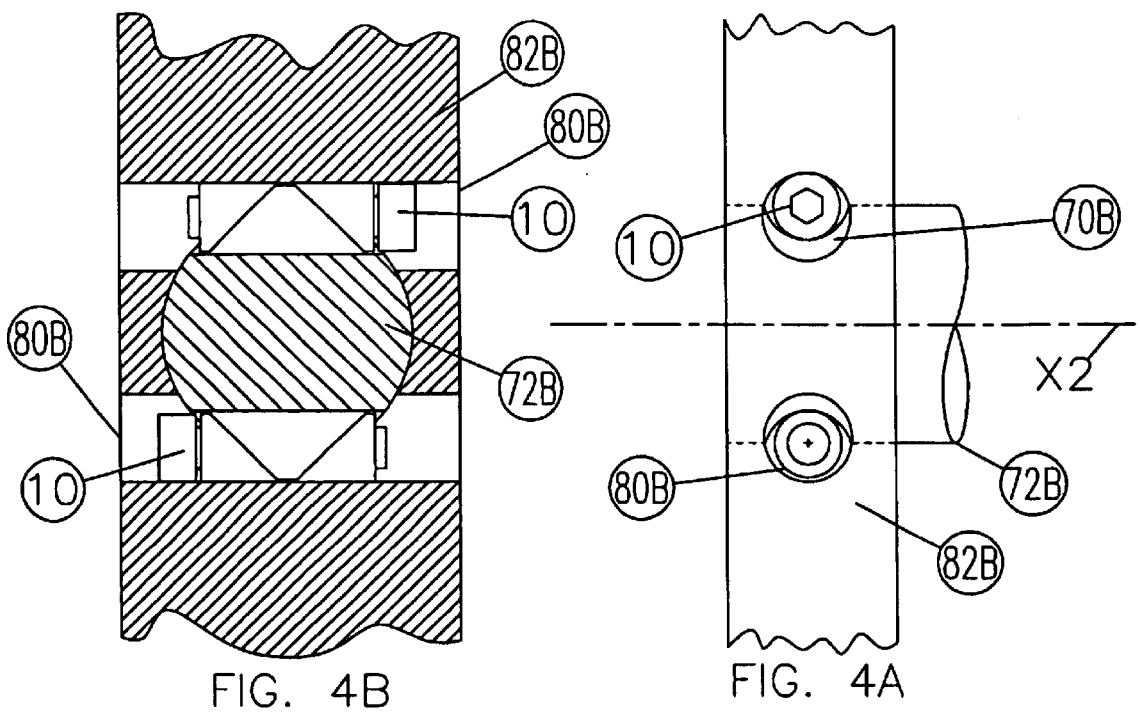
FIGS. 4A–4B are respectively a side elevation view and an end elevation view of an inner part mated to an outer part with the key shown in FIG. 1A installed in a transverse mounted configuration.

FIGS. 4A–4B show the key 10 installed in a transverse mounted configuration between mating parts 72B, 82B. In this configuration, access holes 80B are provided in the outer part 82B to allow installation of the key 10 between the mating parts 82B, 72B. Pockets 70B may also be provided in the outer surface of the inner part 72B for holding the key 10. The pockets 70B and access holes 80B are oriented generally transverse to the longitudinal axis $X_2$ of the inner part 72B. To connect the mating parts 82B, 72B together, the key 10 is expanded substantially the same as described above.

Figures 5, 5A:
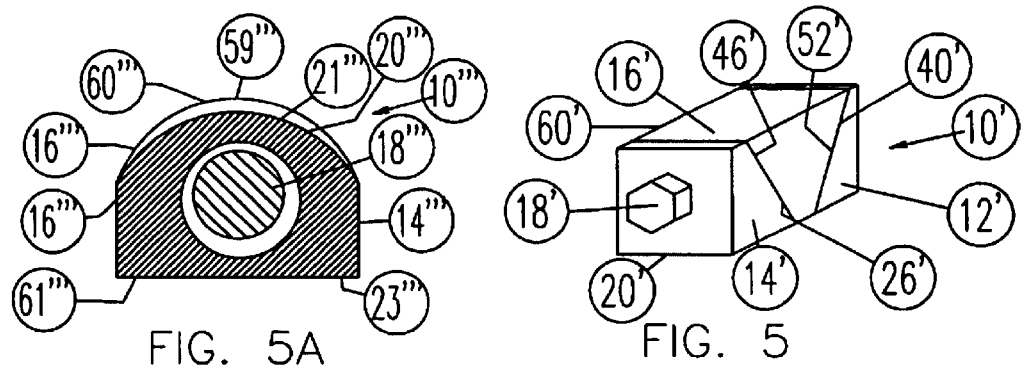
FIG. 5 is perspective view of an expandable key assembly in accordance with a third preferred embodiment of the present invention.
FIG. 5A is a cross-sectional view of an expandable key assembly in accordance with another embodiment of the present invention.

Referring now to FIG. 5, there is shown a perspective view of a key assembly 10' in accordance with a third preferred embodiment of the present invention. The key assembly 10' in FIG. 5 is similar to key assembly 10 shown in FIGS. 1A–1C and described previously, except as otherwise noted. Similar features of key assembly 10' and key assembly 10 have similar reference numbers. Key assembly 10' also includes a front piece 12', a mid-piece 16', and a rear piece 14' assembled on fastener 18' Fastener 18' is inserted through the rear and mid pieces and threaded into the front piece. Front piece 12' has a rear facing wedge or cam surface 40', and rear piece 14' has a front facing wedge or cam surface 26'. The mid-piece 16', positioned on fastener 18' between front and rear pieces 12', 14', has wedge surfaces 52', 46' extending in opposite conformal relation to the wedge surfaces 40', 26' of the front and rear pieces. When fastener 18' is threaded into the front piece 12', the front and rear pieces wedge or cam the mid-piece 16' outwards to expand the key assembly 10'. The outer surface 20', 60' of the rear, mid, and front pieces 14', 16', 12' have a generally rectangular shape. Key assembly 10' is preferably installed in key ways (not shown) having a generally rectangular cross-section formed into the mating parts connected with the key assembly 10'. It is also within the scope of the present invention to provide a key assembly 10''' wherein the outer surface 20''', 60''' of the front end, mid, and rear pieces 16''', 14''' have an exterior shape which is substantially circular side 23''', 61''' on one side 21'', 59''' and substantially rectangular on the other side 23''', 61''' (see FIG. 5A).

Figure 6:
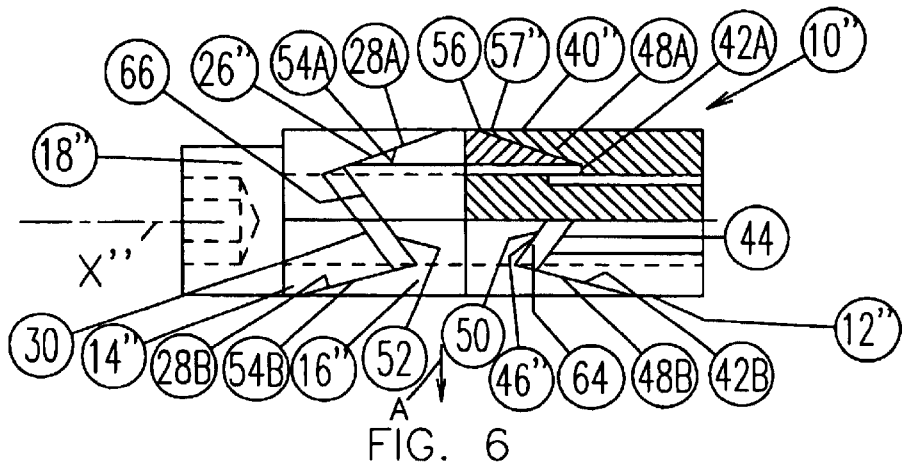
FIG. 6 is a partial cross-sectional view of an expandable key assembly in accordance with a fourth preferred embodiment of the present invention.

Referring now to FIG. 6, there is shown a partial cross-sectional view of an expandable key assembly 10'' in accordance with a fourth preferred embodiment of the present invention. Key assembly 10'' in FIG. 6 is substantially similar to key assembly 10 shown in FIG. 1, and described previously, except as otherwise noted below. Similar features are similarly numbered. The front face 26'' of the rear end piece 14'' in key assembly 10'', has cam surfaces 28A, 28B for engaging the mid-section 16''. In the preferred embodiment, the front face 26'' has a general Z-shape which define upper and lower cam surfaces 28A, 28B as shown in FIG. 1A. The cam surfaces 28A, 28B are pitched relative to the longitudinal axis X'' of the key assembly 10'' to generate about a 4:1 mechanical advantage. In alternate embodiments, the front face of the rear end piece may have any other suitable configuration defining one or more cam surfaces pitched to provide a suitable mechanical advantage. The section 30 separating the upper and lower cam surfaces 28A, 28B has a reverse pitch relative to the pitch of the cam surfaces, though the section between the upper and lower cam surfaces may be vertically orientated or have any other suitable orientation. As seen in FIG. 6, the rear face 40'' of the front end piece 12'' is substantially symmetrical to the front face 26'' of the rear end piece 14''. Accordingly, the rear face 40'' of the front end 12'' has upper and lower cam surfaces 42A, 42B separated by section 44 of the rear face so that the rear face 40'' has a reversed general Z-shape. The front face 46'' of the mid-piece 16 has a reversed, general Z-shape conforming to the rear face 40'' of the front end piece 12''. The upper and lower ramp surfaces 48A, 48B on the front face 46'' of the mid-piece 16'' complement the cam surfaces 42A, 42B on the front end piece 12''. Section 50 between the upper and lower ramp surface 48A, 48B of the mid-piece 16'' is generally parallel to section 44 of the front piece 12''. The rear face 52'' of the mid-piece 16'' generally conforms to the generally Z-shaped face 26'' of the rear end piece 14''. The upper and lower ramp surfaces 54A, 54B on the mid-piece 16'' generally complement the upper and lower cam surfaces 28A, 28B of the rear end piece 14''. The key 10'' is assembled by placing the rear end piece 14''', mid-piece 16'', and front piece 12'' consecutively on the bolt 18''. A gap 57'' is formed between the oversized and possibly misaligned center bolt hole 56'' in the mid-piece 16'' and the bolt shank. Gaps 66 and 64 are also formed between the mid-piece 16'', and the rear end and front end pieces 14'', 12''. The front and rear gaps 64, 66, and the gap 57''between the bolt hole 56'' and bolt shank allow the mid-piece to move freely in the downward direction shown by arrow A. As the bolt is threaded into the front piece 12'', the cam surfaces 42A, 42B, and ramp surfaces 48A, 48B between the front end piece 12'' and mid-piece 16'', and the cam surfaces 28A, 28B, and ramp surfaces 54A, 54B between the front end piece 14'' and mid-piece 16'' polarize the front, mid, and rear pieces together.

Figure 7:
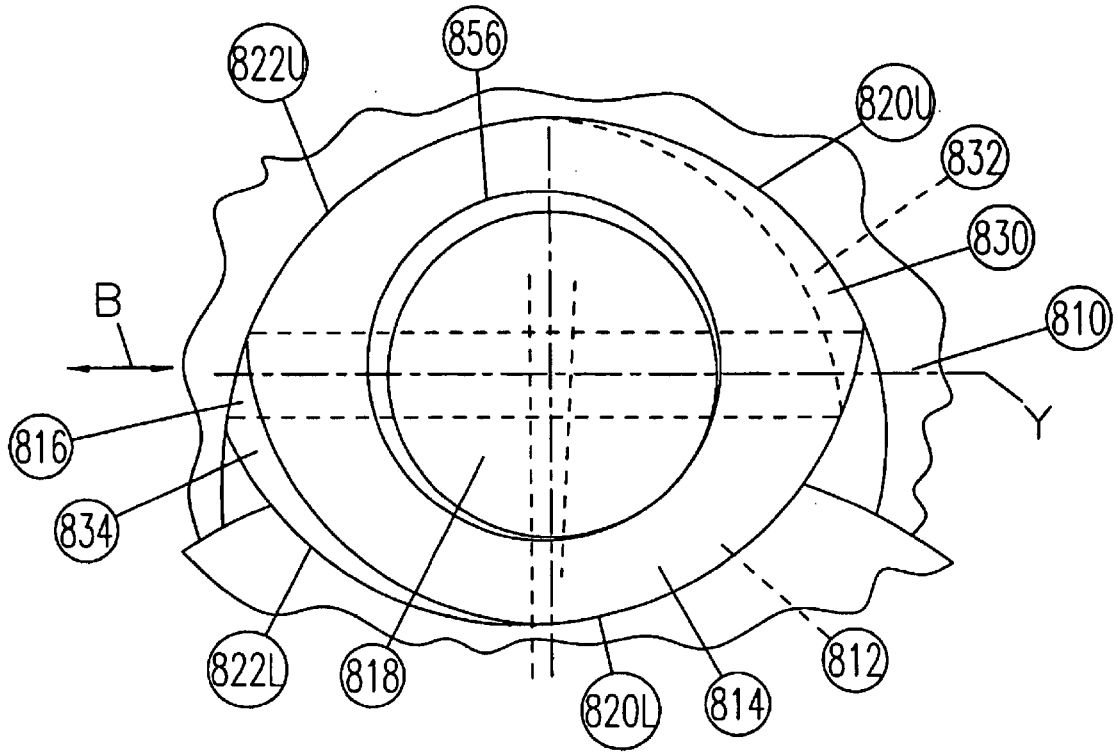
FIG. 7 is an end elevation view of an expandable key assembly incorporating features in accordance with a first preferred embodiment of the present invention.

Referring now to FIG. 7, there is shown an end elevation view of a key assembly 810 in accordance with a fifth preferred embodiment of the present invention. The key assembly 810 in FIG. 7 is substantially similar to the key assembly 10 described above and shown in FIGS. 1A–1B, similar features having similar numbers. Key assembly 810 also comprises a front end piece 812, a mid-piece 816 and a rear end piece 814 connected by a through bolt or screw 818. The screw 818, front end piece 812, mid-piece 816 and rear end piece 814 of the key assembly 810 are substantially similar to fastener 18, front end piece 12, mid-piece 16 and rear end piece 14 of key assembly 10 (see FIGS. 1A–1B) except as otherwise described below. As shown in FIG. 7, the outer surface of the rear end piece 814 has asymmetric upper 820U and lower 820L portions. The upper 820U and lower 820L portions of the outer surface have generally the same curvature radius, but intersect at an axis offset above the centerline Y of the end piece 814. The outer surface (not shown) of front end piece 812 is substantially the same as the rear end piece 814. Similarly, but in an inverted orientation from the end pieces 812, 814, the upper 822U and lower 822L portions of the outer surface of the mid-piece 816 intersect along an axis offset below the centerline Y of the mid piece 816 (see FIG. 7). In addition, the mid-piece 816 has an oversized bore 856 relative to the diameter of the bolt 818. When the key assembly 810 is assembled, and torqued to its engaged position (similar to position A' of key assembly 10 in FIG. 1A), the asymmetric upper 820U and lower 820L portions of the outer surface of the end pieces 812, 814 and the inverted orientation of the mid-piece 816 provide the key 810 with three contact lobes 830, 832, 834. The front end piece 812 and rear end piece 814, each form a respective contact lobe 832, 830, and the mid-piece 816 forms the third contact lobe 834. The first and second contact lobes 830, 832 are located generally diametrically opposite the third lobe 834. The location of the third lobe 834 is adjustable by moving the mid-piece 816 laterally (indicated by arrow B in FIG. 7) relative to the front end 812 and rear end 814 pieces. The oversized bore 856 is adapted to allow lateral movement of the mid-piece 816 when the bolt 818 is installed therethrough but prior to torqueing the key assembly 810 into its engaged position. The third lobe 834 may be adjusted as described to overcome lateral misalignment between the mating parts being connected by the key assembly 810.

Figure 9A:
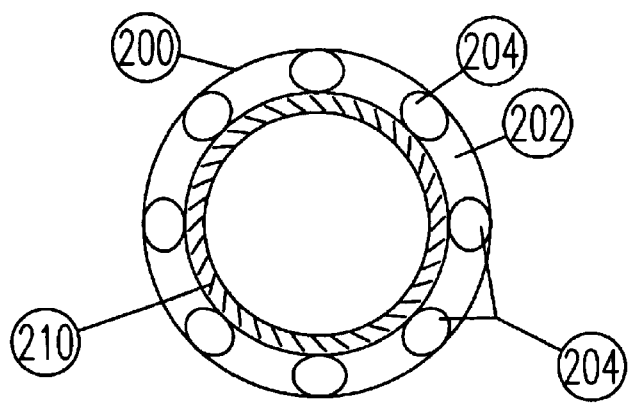
FIGS. 9A–9C are respectively a side elevation view of a clamping collar, and two partial magnified views of the collar showing installation of the key in FIG. 1A in accordance with a sixth preferred embodiment of the present invention, wherein in FIG. 9B the collar is shown in a first position, and in FIG. 9C the collar is shown in a second position.
Figures 9B, 9C:
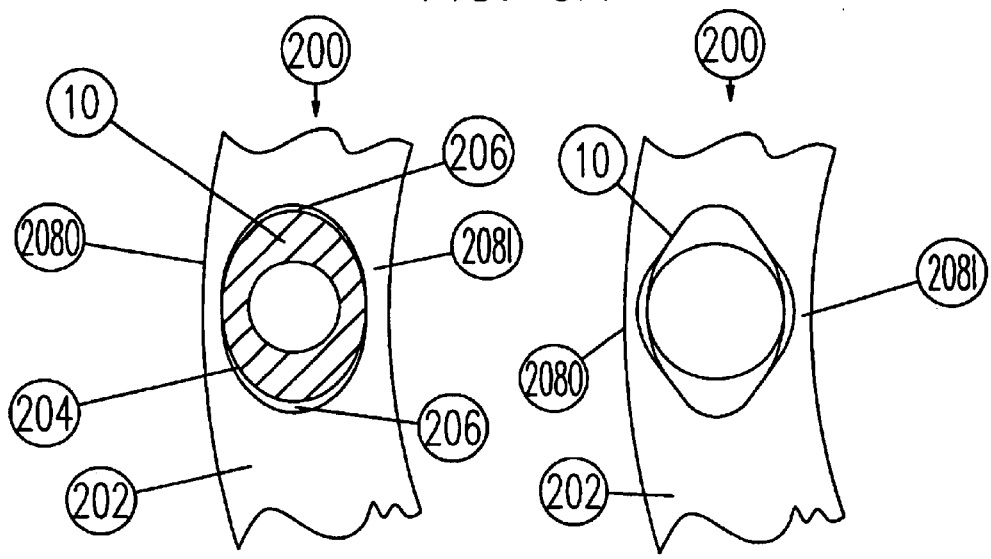

It is also within the scope of the present invention to employ the expandable key assembly in a clamping collar. Referring now to FIGS. 9A–9C, there is shown an end elevation view, with a first partial elevation, and a second partial elevation of a clamping collar 200. The clamping collar 200 generally comprises a ring 202 with holes 204 for receiving key assemblies of the instant invention such as key assembly 10 shown in FIG. 1A. The clamping collar which has an inner bore 206 is placed over a member, such as a pipe or shaft 210 in order to clamp the pipe. In particular, the ring 202 of the clamping collar 200 may be made of metal or plastic or any other suitable material. The ring 202 has a number of holes 204 equally distributed around the circumference of the ring. In FIG. 9A, the ring 202 is shown as having eight holes, though it may have any suitable number of holes. The holes 204 in the ring 202 have a generally oval shape adapted to accommodate the oval shape of the key. The holes 204 are generally elongated at the ends to form gaps 206 between the key 10 (when installed therein) and the edge of the hole. The width of the ring 202 is sized such that the holes 204 form a thin inner member 208I, and thin outer member 208O. The width of the thin members 208I, 208O are such that, when the key 10 is expanded in the hole 204 (by torqueing bolt 18 shown in FIG. 1A), the thin members 208I, 208O plastically deform away from the key 10. The inner member 208I is deformed inwards against the pipe member 210 within the ring 202 thereby clamping the pipe. As shown in FIG. 9C, the gaps 206 between the hole 204 and the key 10 are taken up by deformation of the inner and outer thin members 208I, 208O allowing the deformation of the members to occur mostly in bending with little increase in the hoop stress being induced in the thin members.

Figures 10A, 10B:
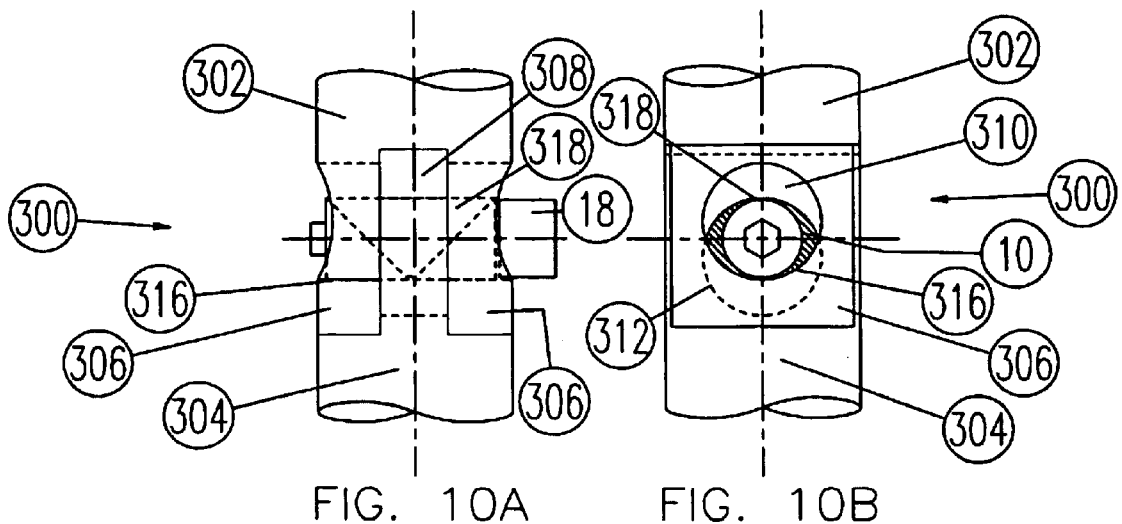
FIGS. 10A–10B are respectively a top plan view and a side elevation view of a clevis coupling using the key in FIG. 1A in accordance with a seventh preferred embodiment of the present invention.

It is further within the scope of the present invention to use the expandable key assembly to lock members joined with a clevis connection. Referring now to FIGS. 10A–10B, there is shown respectively a plan view, and an elevation view of a clevis coupling 300 connecting one member 302 to another 304. The clevis coupling 300 comprises two outer ears 306 depending from the end of one member 302, and an opposing intermediate member 308 depending from the other member 304. The outer ears 306 have through holes 310, and the intermediate member 308 has a through hole 312. The holes 310, 312 in the outer ears and the intermediate member are mis-aligned such that, when the ears 306 are seated against member 304, the key 10 may be inserted through all holes 310, 312. When the key 10 is expanded (by torqueing the bolt 18, see FIG. 1A), the key 10 is clamped between one edge 316 of holes 310 and an opposing edge 318 of hole 312. The clamping action between the expanded key 10 and the holes in the clevis locks the clevis coupling 300.

Referring now to FIGS. 11A–11C, in accordance with still another preferred embodiment of the present invention, the expandable key assembly may be used for coupling a tension member 400, such as a tube, pipe, or rod, or any other suitable member, to a support member or foundation 402. The support member 402 has a hole 404 for receiving therein one end of the tension member 402. The support member 402 also has a slot 406 formed therein. The slot 406 is orientated substantially perpendicular to and intersects the hole 404 for the tension member. The tension member 402 preferably, has two opposing recesses or scallops 408 formed therein, though in alternate embodiments, the tension member may have one or more of the recesses. In the preferred embodiment, the recesses 408 have a general semi-oval shape generally complementing the outer shape of the key 10, though in alternate embodiments, the recesses in the tension member may have any other suitable shape. The tension member 402 is connected to the support member 400 by inserting the tension member into the receiving hole 404 until the recesses 408 are substantially aligned with the slot 406 in the support member. Two keys 10 are then inserted into the slot 406 to enter the recesses 408 in the tension member 402. The bolts 18 of the keys are torqued to expand the keys 10 which captures the keys between the tension member 402 and support member 400. The keys 10 form a removable coupling between tension member 402 and support member 400. The keys 10 may be removed by un-torqueing the bolts 18 and removing the keys 10 using a suitable grabbing device 412 such as a pair of needle noise pliers (see FIG. 11A).

Figure 12A:
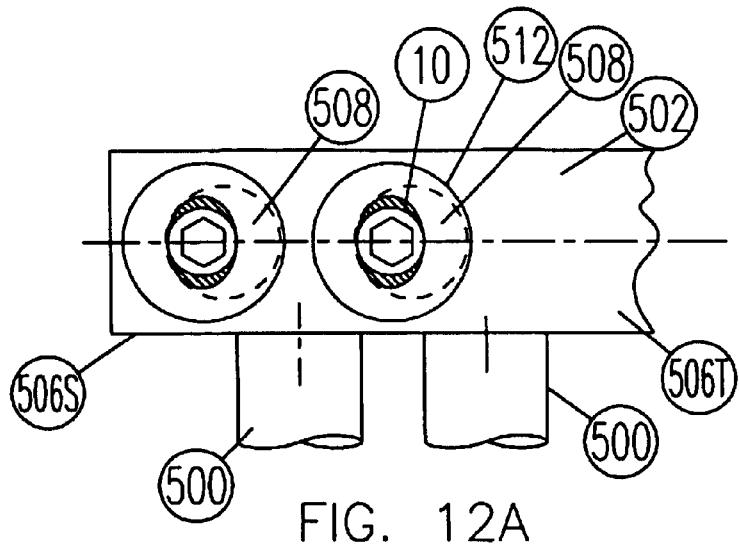
FIGS. 12A–12C are respectively a top plan view, a first cross-sectional view, and a second cross-sectional view taken through line A of FIG. 12, showing an electrical bus bar with electrical terminal connectors connected thereto using the key shown in FIG. 1A.
Figure 12B:
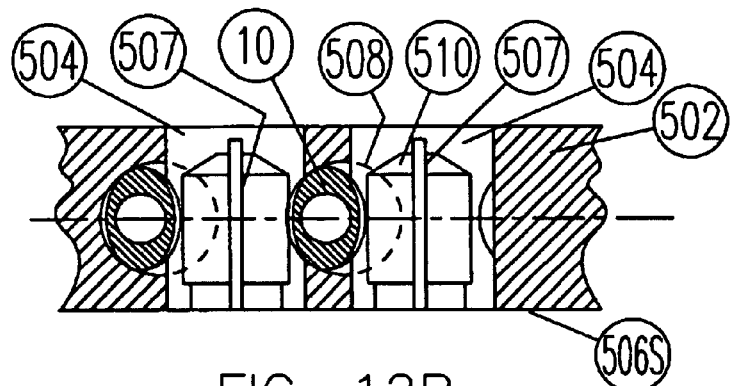
Figure 12C:
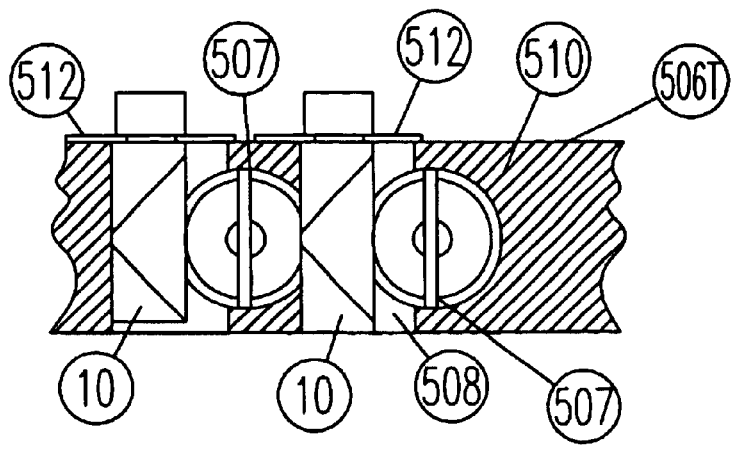

Referring now to FIGS. 12A–12C, there is shown still another preferred embodiment of the present invention. FIGS. 12A–12C show electrical cables 500 being connected to bus bar 502 using the expandable key assembly 10. The bus bar 502 has conductor receiver holes 504 formed in a first face 506S of the bar. The bus bar 502 also has holes 508, formed through face 506T, generally orthogonal to the conductor receiving holes 504. Each of the holes 508 through face 506T partially intersects a corresponding one of the conductor receiving holes 504, as shown in FIG. 12B. Each electrical cable 500 terminates in a contact 510. The contact 510 has a general cylindrical shell configuration. One or more longitudinal slots 507 are formed in the shell of the contact 510 to allow the contact to resiliently flex radially. The bare conductor of the electrical cable 500 is located within the shell of the contact 510. When the electrical cable 500 is connected to the bus bar 502, the cable terminal with the contact 510 thereon is inserted into one of the conductor receiving holes 504 in the bus bar. A key assembly 10 is then inserted through a corresponding hole 508 in face 506T of the bus bar 502 as shown in FIGS. 12B–12C. An outer washer 512 may be placed over the hole 508 to prevent moisture from entering the bus bar. The key assembly 10 is expanded by torqueing bolt 18 to expand the key assembly(see FIG. 1A) which in turn compresses the flexible shell of the contact 510 inward against the electrical conductor of cable 500. This also clamps the cable 500 in the conductor receiving holes 504 in the bus bar 502. Hence, when the key assembly 10 is expanded, a connection is formed between the conductor of cable 500 and contact 510, and between the contact 510 and the bus bar 500.

It is still within the scope of the present invention to attach a saddle clamp bracket, as in the case of a bicycle saddle, to a post using the key 10. Referring now to FIGS. 13A–13B, there are shown a partial side elevation view and a partial end elevation view of a saddle clamp bracket attachment. The saddle clamp bracket 618 comprises a main section 620 with a post socket section 624 depending therefrom. The post socket section 624 is adapted for mating a post 614 therein using key assembly 10 as shown in FIG. 13A. The main section 620 includes a bore 622 for generally holding two clamp halves 612U, 612L therein. Saddle wires 616 (which are part of the saddle, not shown) are located between the upper and lower clamp halves 612U, 612L. Two keys 10 are preferably located within the bore 622 generally diametrically opposite each other such that when the keys 10 are brought into the engaged position (similar to position A' of key assembly 10 shown in FIG. 1A) the clamp halves and saddle wires are captured to the saddle bracket 618.

It is also within the scope of the present invention to provide an indexing connection between mating male and female parts 916, 914. Referring now to FIG. 14, there is shown a partial end view of a connection between mating male 916 and female 914 parts using key assemblies 10, wherein the male and female parts may be indexed relative to each other approximately 360°. The inner surface 918 of the female part 914 has scallops 910 substantially uniformly distributed on the inner surface. The scallops 910 are angularly separated by an angle β. In the preferred embodiment the inner surface has twenty scallops formed therein. The outer surface 920 of the male part 916 is also scalloped, with scallops 912 substantially uniformly distributed on the surface. In the preferred embodiment the outer surface has eighteen scallops 912. The scallops 912 on the outer surface are separated by angle α (see FIG. 14). Angle α is different than angle β. The difference between the angles (α-β) allows the male and female parts to be indexed relative to each other in relatively small increments. As seen in FIG. 14, in the preferred embodiment, two key assemblies 10 (shown in FIGS. 1A–1B) are inserted in the gap 924 between male and female parts 916, 914. The key assemblies 10 are inserted diametrically opposite each other. The male part 916 is further stabilized within the female part 914 by radial support members 922A, 922B. Each radial support member 922A, 922B preferably includes outer plate members 923, and one or more rollers 926 (only one support roller 926 is shown in FIG. 14 for example purposes). Each support roller 926 is mounted to the support plate 923 of the corresponding radial support member 922A, 922B, with a fastener 928. In the preferred embodiment, the support roller 926 is mounted on the radial support member 922A, 922B to bear against the inner surface 918 of the female part 914. In alternate embodiments, the support roller may be positioned on the radial support member to bear against the outer surface of the male part. The support roller 926 is preferably spring loaded, allowing the roller to move radially in and out over scallops 910 when the support members 922A, 922B are rotated. The male part 916 is locked to the female part 914 by expanding the key assemblies 10 (to a position similar to position A' of key assembly 10 shown in FIG. 1A) which engages the key assemblies 10 to the male and female parts. In order to index the male and female parts relative to each other, the key assemblies 10 are disengaged (similar to position A of key assembly 10 in FIG. 1A). The male and female parts 916, 914 may then be rotated relative to each other in angular increments of (α-β) (see FIG. 14). After indexing, the male and female parts 916, 914 are again locked together by expanding key assemblies 10.

The present invention provides a key assembly 10, 10', 10", 10''', 10⁴ comprising of three congruently shaped axially extending pieces with mating wedge-like angular cuts intended to cause said parts to expand in a direction of the minor width when a screw type fastener pulls the two outer members together. Those angular surfaces are made so the pieces do not permanently lock up, thereby allowing the device to be removed and re-used. The angles may be equal so the pieces stay in place axially when the fastener is tightened. The cross-section of each of the three pieces is in the form of generally identical cat-eyes, (i.e. two intersecting circles whose centers do not coincide, and whose minor width is less than the radii). The cross-sectional shapes may vary however, depending upon the intended application. They may be totally round, totally square, or half of each or a combination of these and other geometric shapes. The three parts are proportioned such that the opposing surfaces in the direction of expansion run substantially the full length of the assembly.

The distal member is threaded to accept the threaded fastener. The proximal member accepts the body of the fastener and shoulders the head of the fastener. The intermediate member is bored to allow motion between the distal and proximal members, but only in the direction of expansion, and can be bored to within a few thousandths of the surface to provide substantial expansion. The bored hole clearance should be more than the expected tolerances of the keyways. The threaded fastener may be a screw, bolt, thumbscrew and the like. Because of the cat-eye shape, many devices can be ganged both axially and circumferentially, each device sharing the load. In addition, only a few sizes are needed to satisfy a wide range of demand traditional devices require a plethora of sizes. Because the expansion provides both axial force and torque resistance, there is no need for a setscrew. Therefore there is no need for a hub to house the setscrew. Elimination of the hub and setscrew substantially reduces weight and size in comparison to coupling devices of the prior art. Elimination of the hub also permits construction of a cluster gear using individually made and assembled gears, instead of hogging it out of one solid piece of metal. This advantage yields lower initial cost, speedier delivery, and faster, less costly repairs. By using more than one, the key assemblies can be utilized to accurately position things like lenses, bearings, switches, and the like. Also for dynamic and static balancing, mounting ill-fitting or crudely shaped parts, and mounting non-machined castings or non-contacting parts. These assemblies can be buried deep in a machine and still allow access from the end, through a small hole, with a ball shaped hex key, at an approach angle of 25 degrees or less. The fact that the front end piece is an appreciable distance from the head of the fastener 18, allows taking advantage of the spring characteristics of the free length of the fastener. Stretching the bolt in this fashion gives the effect of a lock-washer. The fastener will not come loose during vibration or temperature changes that cause expansion and contraction of the assembly. The expanding assembly 10 is removable and re-useable.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A coupling device for coupling a first part to a mating second part, the coupling device comprising:

a fastener with a support shoulder extending radially from the fastener;

a distal member movably engaged to the fastener to move relative to the fastener along a longitudinal axis of the fastener when the fastener is turned relative to the distal member; and an intermediate member disposed on the fastener between the distal member and the support shoulder of the fastener;

wherein the distal member and the intermediate member have generally congruent shapes, and wherein when the distal member is moved towards the support shoulder on the fastener, the distal members is biased against the intermediate member for effecting outward expansion of the coupling device relative to the longitudinal axis of the fastener;

wherein the profile of the outer perimeter of the coupling device is formed by two intersecting circles resulting in a cateye shape;

wherein the coupling device is inserted between an inner surface of the first part and an outer surface of the second part, the outer surface of the second part being located inside the inner surface of the first part;

wherein there are two semicircular grooves of the same radius as the outer perimeter of the coupling device, one in the inner surface of the first part and one in the outer surface of the second part;

said pair of semicircular grooves being mismatched rotationally relative to each other forming two translated semicircles at the intersection of the first and second parts;

said coupling device being canted and located within the space formed by the mismatched semicircular grooves;

wherein expansion of the coupling device forces the members of the coupling device against the surface of said semicircular grooves and couples the first and the second parts together in shear.

2. A coupling device for coupling a first part to a mating second part, the coupling device comprising:

a fastener with a support shoulder extending radially from the fastener;

a distal member movably engaged to the fastener to move relative to the fastener along a longitudinal axis of the fastener when the fastener is turned relative to the distal member; and an intermediate member disposed on the fastener between the distal member and the support shoulder of the fastener;

wherein the distal member and the intermediate member have generally congruent shapes, and wherein when the distal member is moved towards the support shoulder on the fastener, the distal members is biased against the intermediate member for effecting outward expansion of the coupling device relative to the longitudinal axis of the fastener;

wherein the distal member is a first wedge member with an angled surface extending towards the support shoulder, and wherein the intermediate member is a second wedge member having a pair of opposing angled surfaces, a first one of the angled surfaces extending in opposite conformal relation to the angled surface of the first wedge member, and a second one of the angled surfaces extending in the opposite direction from the first angled surface;

wherein the profile of the outer perimeter of the coupling device is formed by two intersecting circles resulting in a cateye shape;

wherein the coupling device is inserted between an inner surface of the first part and an outer surface of the second part, the outer surface of the second part being located inside the inner surface of the first part;

wherein there are two semicircular grooves of the same radius as the outer perimeter of the coupling device, one in the inner surface of the first part and one in the outer surface of the second part;

said pair of semicircular grooves being mismatched rotationally relative to each other forming two translated semicircles at the intersection of the first and second parts;

said coupling device being canted and located within the space formed by the mismatched semicircular grooves;

wherein expansion of the coupling device forces the members of the coupling device against the surface of said semicircular grooves and couples the first and the second parts together in shear.

\* \* \* \* \*